United States Patent
Alshhrani et al.

(10) Patent No.: US 9,564,066 B1
(45) Date of Patent: Feb. 7, 2017

(54) DENTURE CONSTRUCTION TEACHING TOOL

(71) Applicant: KING SAUD UNIVERSITY, Riyadh (SA)

(72) Inventors: Waled Mohammed Alshhrani, Vancouver (CA); Hanan Nejer Sahil Alotaibi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/151,472

(22) Filed: May 10, 2016

(51) Int. Cl.
*G09B 19/00* (2006.01)
*G09B 23/28* (2006.01)

(52) U.S. Cl.
CPC ............ *G09B 23/283* (2013.01); *G09B 19/00* (2013.01)

(58) Field of Classification Search
USPC ................................................ 434/262, 263
See application file for complete search history.

(56) References Cited

U.S. PATENT DOCUMENTS

| 3,886,661 A | 6/1975 | Neill |
| 4,659,311 A | 4/1987 | Raskin |
| 6,270,701 B1 | 8/2001 | Kuroda |

FOREIGN PATENT DOCUMENTS

| CN | 104966451 A | 10/2015 |
| JP | 2014-147588 A | 8/2014 |

*Primary Examiner* — James Hull
(74) *Attorney, Agent, or Firm* — Richard C. Litman

(57) ABSTRACT

The denture construction teaching tool is an educational tool for instructing students on the molding process used to construct removable dental prosthodontics. The denture construction teaching tool includes a base having opposed upper and lower surfaces, and a spacer block releasably secured to the upper surface of the base. A set of tooth molds are releasably secured to the upper surface of the base about the spacer block. Each of the tooth molds has an injection port and a venting port formed therethrough. Each tooth mold further has a lower molding portion and an open upper portion. A removable lid releasably covers the open upper portions of the set of tooth molds, such that a molding material may be injected through the injection ports of the set of tooth molds with excess molding material exiting through the respective venting ports.

13 Claims, 5 Drawing Sheets

DENTURE CONSTRUCTION TEACHING TOOL

BACKGROUND OF THE INVENTION

1. Field of the Invention

The present invention relates to the fabrication of dental prosthodontics, and more particularly to a teaching tool for teaching students the molding process involved in the fabrication of removable dental prosthodontics, such as dentures and the like.

2. Description of the Related Art

Dentures are prosthetic devices constructed to replace missing teeth; they are supported by the surrounding soft and hard tissues of the oral cavity. Modern dentures are most often fabricated in a commercial dental laboratory or by a denturist using a combination of tissue shaded powders polymethylmethacrylate acrylic (PMMA). The process of fabricating a denture typically begins with an initial dental impression of the maxillary and mandibular ridges. Standard impression materials are used during the process. The initial impression is used to create a simple stone model that represents the maxillary and mandibular arches of the patient's mouth.

Once the initial impression is taken, the stone model is used to create a custom impression tray, which is used to take a second and much more detailed and accurate impression of the patient's maxillary and mandibular ridges. A wax rim supported by an acrylic base is fabricated to assist the dentist or denturist in establishing the vertical dimension of occlusion. After this, the jaw relation record is established to marry the position of one arch to the other.

Once the relative position of each arch to the other is known, the wax rim can be used as a base to place the selected denture teeth in correct position. This arrangement of teeth is tested in the mouth so that adjustments can be made to the occlusion. After the occlusion has been verified by the dentist or denturist and the patient, and all phonetic requirements are met, the denture is processed. Processing a denture is typically performed using a lost-wax technique in which the form of the final denture, including the acrylic denture teeth, is invested in stone. This investment is then heated, and when it melts the wax is removed. The remaining cavity is then either filled by forced injection or pouring in the uncured denture acrylic, which is either a heat cured or cold-cured type. After a curing period, the stone investment is removed, the acrylic is polished, and the denture is complete.

When the dentist establishes the vertical dimension of occlusion, and when the jaw relation is established, the dentist is required to manually manipulate materials, primarily operating through touch and sight. It is this part of the process which requires practice to ensure that a proper prosthodontic piece is fabricated. Students do not often have the opportunity to practice this process other than on actual patients. Thus, a denture construction teaching tool solving the aforementioned problems is desired.

SUMMARY OF THE INVENTION

The denture construction teaching tool is an educational tool for instructing students on the molding process used to construct removable dental prosthodontics. The denture construction teaching tool includes a base having opposed upper and lower surfaces, and a spacer block releasably secured to the upper surface of the base. A set of tooth molds are releasably secured to the upper surface of the base about the spacer block. Each of the tooth molds has an injection port and a venting port formed therethrough, and each tooth mold further has a lower molding portion and an open upper portion. A removable lid releasably covers the open upper portions of the set of tooth molds, such that a molding material may be injected through the injection ports of the set of tooth molds with excess molding material exiting through the respective venting ports.

Preferably, the denture construction teaching tool is in the form of a kit provided with the set of tooth molds and also a set of edentulous molds. Preferably, each of the sets includes four separate molds, which are representative of a patient's rear left maxillary (or mandibular) quadrant, the patient's front left maxillary (or mandibular) quadrant, the patient's front right maxillary (or mandibular) quadrant, and the patient's rear right maxillary (or mandibular) quadrant. The student may then select one or more molds from each set to form a dental prosthodontic piece having any desired combination of teeth and edentulous ridges.

These and other features of the present invention will become readily apparent upon further review of the following specification.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
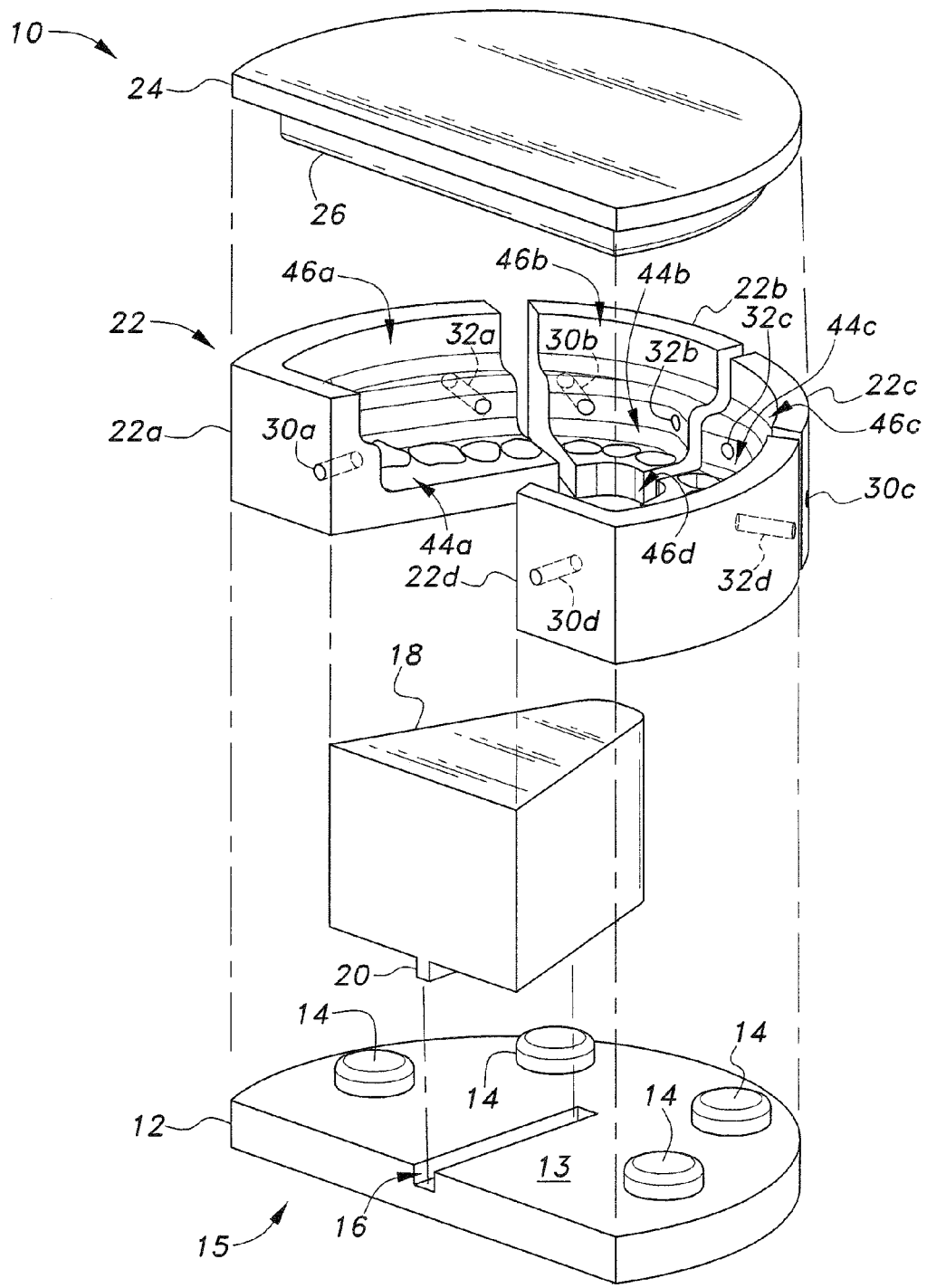
FIG. 1 is an exploded perspective view of a denture construction teaching tool according to the present invention.
Figure 2:
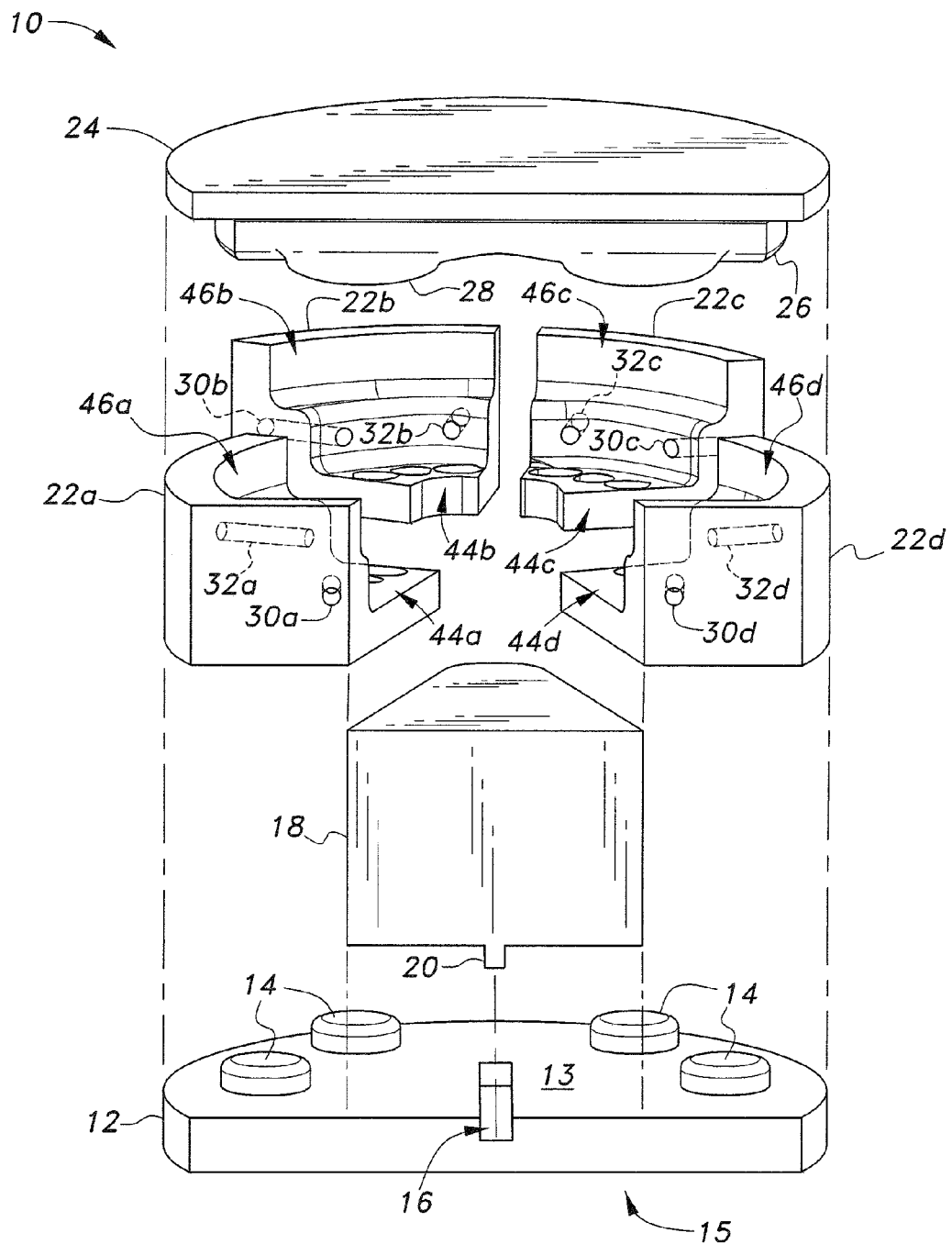
FIG. 2 is a rear, exploded perspective view of a denture construction teaching tool according to the present invention.

The denture construction teaching tool 10 is an educational tool for instructing students on the molding process used to construct removable dental prosthodontics, such as dentures and the like. As shown in FIGS. 1 and 2, the denture construction teaching tool 10 includes a base 12 having opposed upper and lower surfaces 13, 15, respectively. The lower surface 15 is adapted for support on any suitable support surface, such as a desk, table or the like. The base 12 may be constructed from any suitable material, such as plastic, steel or the like.

A spacer block 18 is releasably secured to the upper surface 13 of base 12. The spacer block 18 may be releasably secured by any suitable method, such as releasable engagement between an engaging member 20 and a slot 16 formed in upper surface 16 of base 12, for example. As shown, the spacer block 18 has a cross-sectional contour resembling the tongue or palate portion of a patient's mouth. Spacer block 18 may be formed from any suitable material, such as silicone rubber or the like.

A set of tooth molds 22 are releasably secured to the upper surface 13 of base 12 about the spacer block 18. The set of tooth molds 22 may be formed from plastic, steel or the like. The set of tooth molds 22 may be releasably secured to upper surface 13 of base 12 by any suitable method. For example, magnets 14 may be mounted on upper surface 13 of base 12 for magnetic engagement with the set of tooth molds 22. If the set of tooth molds is formed from steel or other paramagnetic material, then the tooth molds may directly magnetically engage magnets 14. If the tooth molds 22 are formed from plastic or the like, then corresponding magnets (or a paramagnetic material) may be mounted on the set of tooth molds 22.

As shown in FIGS. 1 and 2, the set of tooth molds 22 preferably includes a plurality of molds. Although any number of molds may be included in the set of tooth molds 22, the example of FIGS. 1 and 2 shows four such molds 22a, 22b, 22c and 22d, respectively corresponding to the patient's rear left maxillary (or mandibular) quadrant, the patient's front left maxillary (or mandibular) quadrant, the patient's front right maxillary (or mandibular) quadrant, and the patient's rear right maxillary (or mandibular) quadrant.

Figure 3:
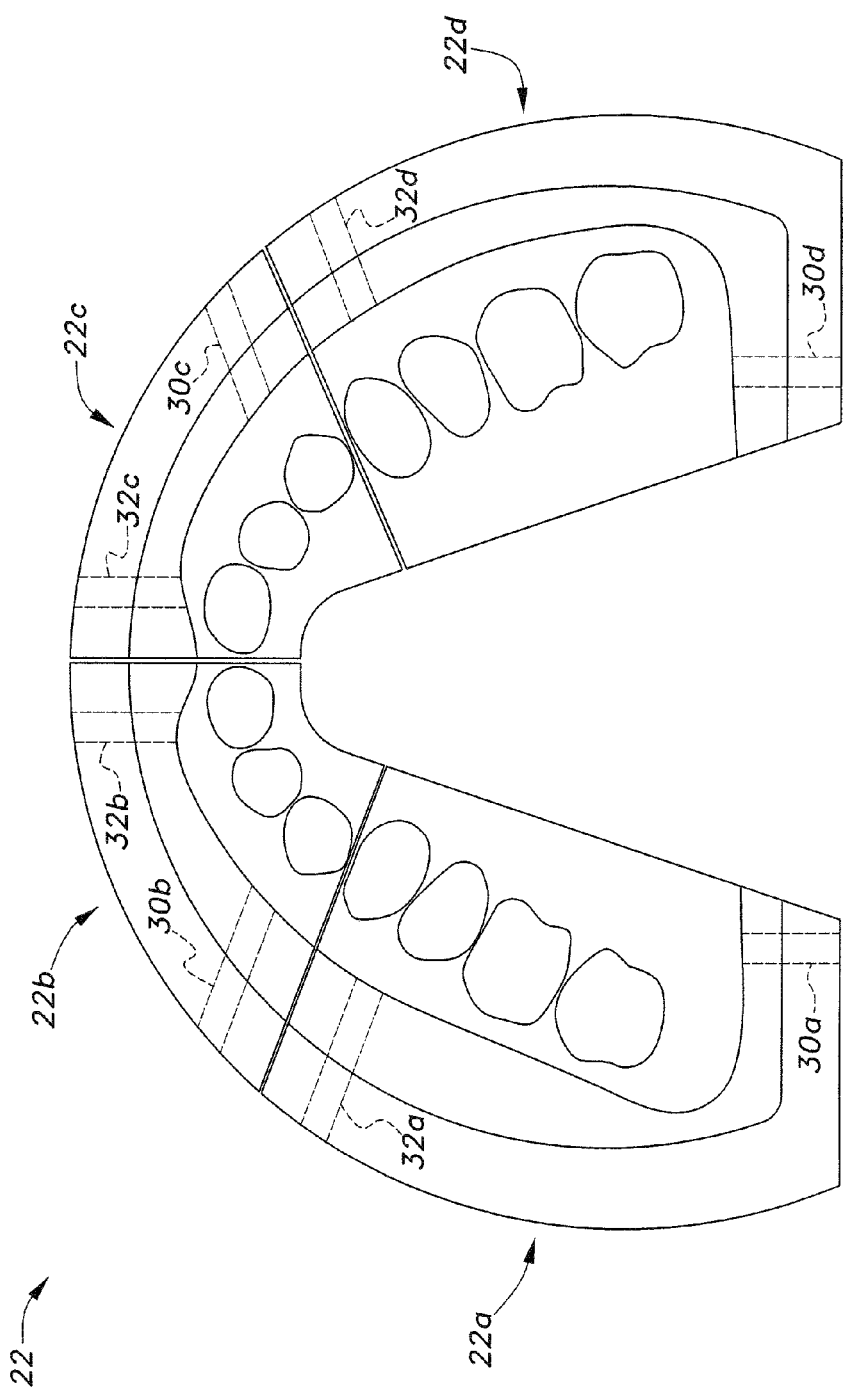
FIG. 3 is a top view of a set of tooth molds of the denture construction teaching tool according to the present invention.

As best shown in FIG. 3, tooth mold 22a has an injection port 30a and a venting port 32a formed therethrough. The molding material, such as wax or the like, is injected through the injection port 30a, and the venting port 32a releases air and any excess molding material. Similarly, tooth mold 22b has an injection port 30b and a venting port 32b formed therethrough. Tooth mold 22c has an injection port 30c and a venting port 32c formed therethrough. Tooth mold 22d has an injection port 30d and a venting port 32d formed therethrough. As best seen in FIGS. 1 and 2, tooth mold 22a includes a lower molding portion 44a (including the contoured molds representative of the patient's teeth) and an open upper portion 46a. Similarly, tooth mold 22b includes a lower molding portion 44b and an open upper portion 46b. Tooth mold 22c includes a lower molding portion 44c and an open upper portion 46c. Tooth mold 22d includes a lower molding portion 44d and an open upper portion 46d.

A removable lid 24 releasably covers the open upper portions 46a, 46b, 46c, 46d of the set of tooth molds 22. As shown in FIG. 2, a molding plate 26 may be mounted on a lower surface of the removable lid 24, with molding plate 26 being contoured to simulate the patient's edentulous maxilla (or mandible). Further, a record base layer 28 may be fixed to the molding plate 26. The record base layer 28 may serve as the foundation for the molded denture.

In use, spacer block 18 is releasably secured to base 12 and the set of tooth molds 22 are secured to base 12 about the spacer block 18. The lid 24 is removably secured to the set of tooth molds 22 and the molding material, such as wax or the like, is injected through the injection ports 30a, 30b, 30c, 30d, with excess molding material exiting through the respective venting ports 32a, 32b, 32c, 32d. Following complete injection of the molding material and cooling, the spacer block 18 is removed from the rear of tool 10, and then the lid 24. The molded denture may then be removed from the set of tooth molds 22.

Figure 4:
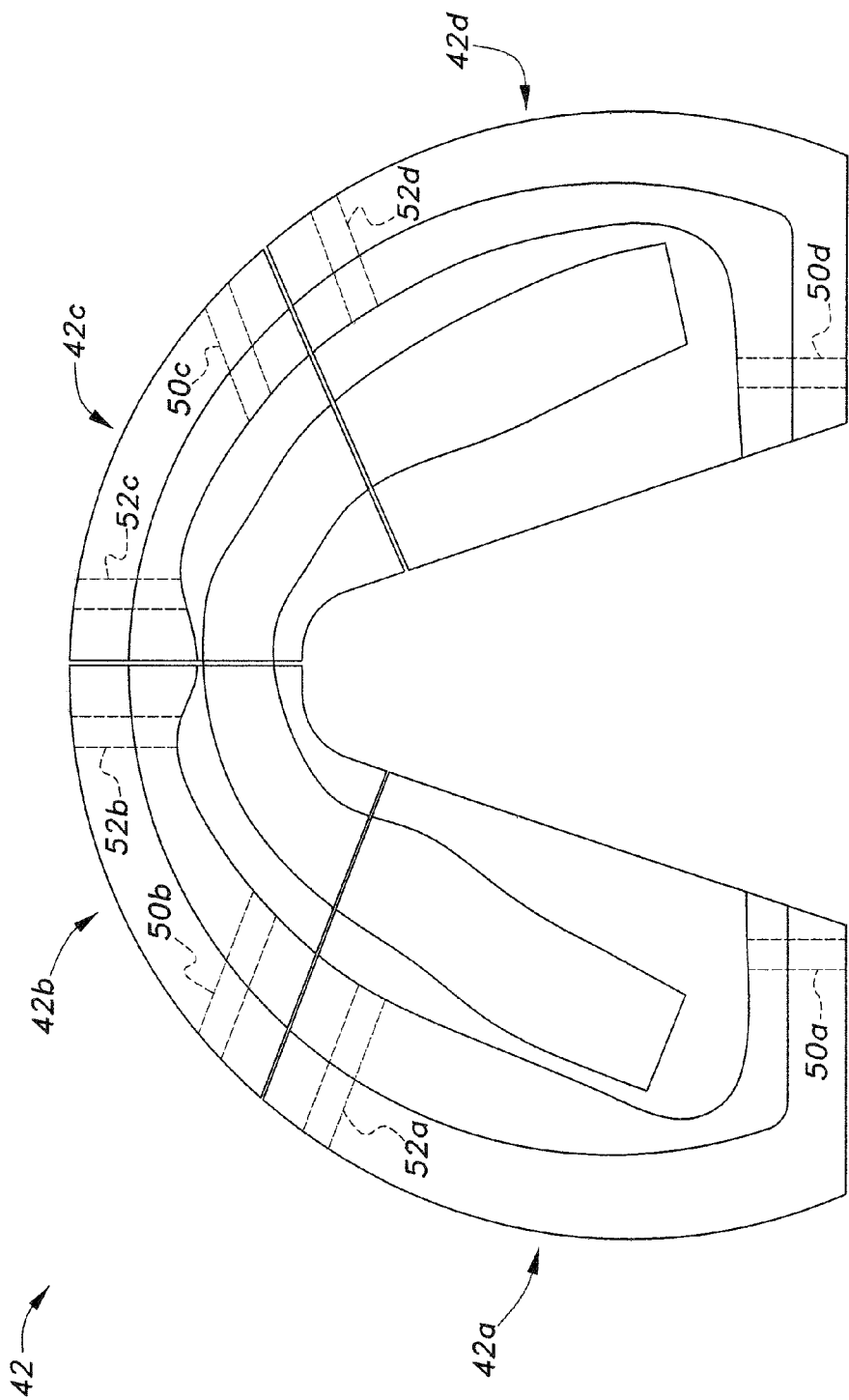
FIG. 4 is a top view of a set of edentulous molds of the denture construction teaching tool according to the present invention.

In FIGS. 1 and 2, only a single set of tooth molds 22 is shown. However, the denture construction teaching tool is preferably provided in the form of a kit including the set of tooth molds 22 and also a set of edentulous molds 42. As shown in FIG. 4, the set of edentulous molds 42 is similar in construction to the set of tooth molds 22, including four separate molds 42a, 42b, 42c, 42d which are respectively representative of a patient's rear left maxillary (or mandibular) quadrant, the patient's front left maxillary (or mandibular) quadrant, the patient's front right maxillary (or mandibular) quadrant, and the patient's rear right maxillary (or mandibular) quadrant.

Similar to the set of tooth molds 22, edentulous mold 42a has an injection port 50a and a venting port 52a formed therethrough. Similarly, edentulous mold 42b has an injection port 50b and a venting port 52b formed therethrough, edentulous mold 42c has an injection port 50c and a venting port 52c formed therethrough, and edentulous mold 42d has an injection port 50d and a venting port 52d formed therethrough.

Figure 5:
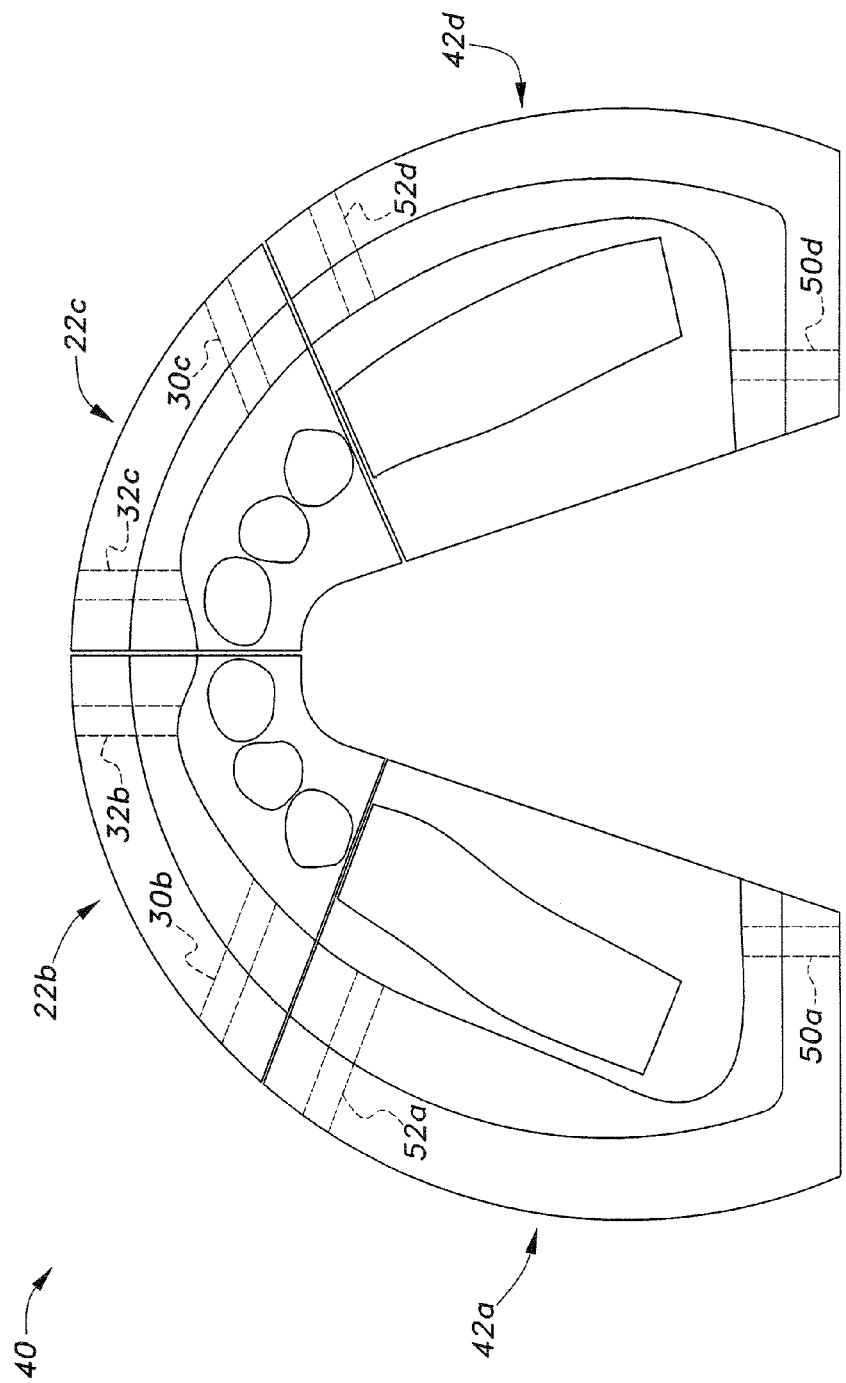
FIG. 5 is a top view of a set of combination molds of the denture construction teaching tool, including tooth molds combined with edentulous molds.

In use, the student may then select one or more molds from each set to form a dental prosthodontic piece having any desired combination of teeth and edentulous ridges. In the example shown in FIG. 5, edentulous molds 42a and 42d are combined with tooth molds 22b and 22c in a combination set 40 for construction of a dental prosthodontic device having teeth in the front left maxillary (or mandibular) quadrant and the front right maxillary (or mandibular) quadrant, and with no teeth in the patient's rear left maxillary (or mandibular) quadrant and rear right maxillary (or mandibular) quadrant.

It is to be understood that the present invention is not limited to the embodiments described above, but encompasses any and all embodiments within the scope of the following claims.

We claim:

1. A denture construction teaching tool, comprising:
   a base having opposed upper and lower surfaces;
   a spacer block contoured to simulate a human tongue or palate releasably secured to the upper surface of said base;
   a set of tooth molds releasably secured to the upper surface of said base about said spacer block such that an inside perimeter of the tooth molds are contoured to fit securely against an outside perimeter of the spacer block, wherein each of the tooth molds has an injection port and a venting port formed therethrough, each of the tooth molds having a lower molding portion and an open upper portion, wherein the set of tooth molds comprises tooth molds respectively corresponding to a patient's rear left maxillary quadrant, the patient's front left maxillary quadrant, the patient's front right maxillary quadrant, and the patient's rear right maxillary quadrant, or tooth molds respectively corresponding to a patient's rear left mandibular quadrant, the patient's front left mandibular quadrant, the patient's front right mandibular quadrant, and the patient's rear right mandibular quadrant;
   a removable lid releasably secured to the open upper portion of the set of tooth molds for releasably covering the open upper portions of said set of tooth molds, whereby a molding material may be injected through the injection ports of said set of tooth molds with excess molding material exiting through the respective venting ports; and
   a molding plate mounted on a lower surface of said removable lid, said molding plate contoured to simulate the patient's edentulous maxilla or edentulous mandible.

2. The denture construction teaching tool as recited in claim 1, wherein a slot is formed in the upper surface of said base for releasably receiving an engaging member projecting downwardly from said spacer block.

3. The denture construction teaching tool as recited in claim 1, wherein the set of tooth molds magnetically engage the upper surface of said base.

4. The denture construction teaching tool as recited in claim 1, wherein the set of tooth molds comprises four tooth molds respectively corresponding to a patient's rear left maxillary quadrant, the patient's front left maxillary quadrant, the patient's front right maxillary quadrant, and the patient's rear right maxillary quadrant.

5. The denture construction teaching tool as recited in claim 1, wherein the set of tooth molds comprises four tooth molds respectively corresponding to a patient's rear left mandibular quadrant, the patient's front left mandibular quadrant, the patient's front right mandibular quadrant, and the patient's rear right mandibular quadrant.

6. A denture construction teaching kit, comprising:
- a base having opposed upper and lower surfaces;
- a spacer block contoured to simulate a human tongue or palate releasably secured to the upper surface of said base;
- a set of tooth molds, wherein each of the tooth molds has an injection port and a venting port formed therethrough, each of the tooth molds having a lower molding portion and an open upper portion;
- a set of edentulous molds, wherein each of the edentulous molds has an injection port and a venting port formed therethrough, each of the edentulous molds having a lower molding portion and an open upper portion, wherein selected ones of said set of tooth molds and selected ones of said set of edentulous molds are releasably secured to the upper surface of said base about said spacer block such that an inside perimeter of the tooth molds and edentulous molds are contoured to fit securely against an outside perimeter of the spacer block;
- wherein the set of tooth molds comprises tooth molds respectively corresponding to a patient's rear left maxillary quadrant, the patient's front left maxillary quadrant, the patient's front right maxillary quadrant, and the patient's rear right maxillary quadrant, or tooth molds respectively corresponding to a patient's rear left mandibular quadrant, the patient's front left mandibular quadrant, the patient's front right mandibular quadrant, and the patient's rear right mandibular quadrant, wherein the set of edentulous molds;
- wherein the set of edentulous molds comprises edentulous molds respectively corresponding to a patient's rear left maxillary quadrant, the patient's front left maxillary quadrant, the patient's front right maxillary quadrant, and the patient's rear right maxillary quadrant, or edentulous molds respectively corresponding to a patient's left mandibular quadrant, the patient's front left mandibular quadrant, the patient's front right mandibular quadrant, and the patient's rear right mandibular quadrant;
- a removable lid releasably secured to the open upper portion of the set of tooth or edentulous molds for releasably covering the open upper portions of the selected ones of said set of tooth molds and said set of edentulous molds, whereby a molding material may be injected through the injection ports of said set of tooth molds with excess molding material exiting through the respective venting ports; and
- a molding plate mounted on a lower surface of said removable lid, said molding olate contoured to simulate the patient's edentulous maxilla or edentulous mandible.

7. The denture construction teaching tool as recited in claim 6, wherein a slot is formed in the upper surface of said base for releasably receiving an engaging member projecting downwardly from said spacer block.

8. The denture construction teaching tool as recited in claim 6, wherein the set of tooth molds magnetically engage the upper surface of said base.

9. The denture construction teaching tool as recited in claim 8, wherein the set of edentulous molds magnetically engage the upper surface of said base.

10. The denture construction teaching tool as recited in claim 6, wherein the set of tooth molds comprises four tooth molds respectively corresponding to a patient's rear left maxillary quadrant, the patient's front left maxillary quadrant, the patient's front right maxillary quadrant, and the patient's rear right maxillary quadrant.

11. The denture construction teaching tool as recited in claim 10, wherein the set of edentulous molds comprises four edentulous molds respectively corresponding to the patient's rear left maxillary quadrant, the patient's front left maxillary quadrant, the patient's front right maxillary quadrant, and the patient's rear right maxillary quadrant.

12. The denture construction teaching tool as recited in claim 6, wherein the set of tooth molds comprises four tooth molds respectively corresponding to a patient's rear left mandibular quadrant, the patient's front left mandibular quadrant, the patient's front right mandibular quadrant, and the patient's rear right mandibular quadrant.

13. The denture construction teaching tool as recited in claim 12, wherein the set of edentulous molds comprises four tooth molds respectively corresponding to the patient's rear left mandibular quadrant, the patient's front left mandibular quadrant, the patient's front right mandibular quadrant, and the patient's rear right mandibular quadrant.

\* \* \* \* \*